(12) United States Patent
Lin

(10) Patent No.: US 7,145,673 B1
(45) Date of Patent: Dec. 5, 2006

(54) SYSTEM, METHOD AND COMPUTER PROGRAM PRODUCT FOR REMOTE MANAGING A DOCUMENT SERVER PRINT JOB

(75) Inventor: Alan Lin, Fremont, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/575,984

(22) Filed: May 23, 2000

(51) Int. Cl.
*H04N 1/40* (2006.01)

(52) U.S. Cl. ...................... 358/1.15; 358/468
(58) Field of Classification Search .............. 358/1.15, 358/1.16, 1.14
See application file for complete search history.

(56) References Cited

U.S. PATENT DOCUMENTS

| | | | |
|---|---|---|---|
| 5,745,659 A * | 4/1998 | Rigau Rigau et al. ....... | 358/1.2 |
| 6,288,790 B1 * | 9/2001 | Yellepeddy et al. ........ | 358/1.15 |
| 6,301,013 B1 * | 10/2001 | Momose et al. ........... | 358/1.15 |
| 6,512,592 B1 * | 1/2003 | Simpson et al. ........... | 358/1.15 |
| 6,545,767 B1 * | 4/2003 | Kuroyanagi ................ | 358/1.14 |

* cited by examiner

*Primary Examiner*—Thomas D. Lee
*Assistant Examiner*—Stephen Brinich
(74) *Attorney, Agent, or Firm*—Oblon, Spivak, McClelland, Maier & Neustadt, P.C.

(57) ABSTRACT

A method of managing a print job from a computer includes the steps of transmitting print job information to a printer, storing the print job information in a storage device separate from the printer, prompting a user to enter identification information at the computer, which is separate from the printer, and comparing the identification information with information stored in the storage device. The method can also include the steps of validating the identification information, displaying the print job information at the computer, editing the print job information at the computer, updating the storage device with edited print job information, and transmitting to the printer the edited print job information. The method can be implemented using a remote manager residing on a computer connected to the printer via a network. A computer program product, and a graphical user interface for managing a document server print job are also disclosed.

33 Claims, 6 Drawing Sheets

SYSTEM, METHOD AND COMPUTER PROGRAM PRODUCT FOR REMOTE MANAGING A DOCUMENT SERVER PRINT JOB

BACKGROUND OF THE INVENTION

1. Field of the Invention

The present invention is directed to document printing systems, methods of printing, and computer program products for managing print jobs.

2. Discussion of the Background

The ability to print documents from a computer has become so widespread that our society is increasingly becoming dependent on that ability. Small, large, and virtual businesses, educational centers, and government agencies all rely on that ability.

In home offices, printers are typically connected directly to a computer. In larger offices, printers are often connected to a network, to which other printers and a number of computers may be connected. The network may be an internal network located inside an office or business, or may be a publically accessible network, such as the Internet, or a combination of both. FIG. 1 shows an illustration of a printing system with a printer 10 connected to a network L1, to which computers 20 are connected.

Independent of whether printers are connected directly to a computer, or connected to a network, printers can work in several different modes depending on the user's specific needs. For example, a printer can work in a "normal" mode in which a document is printed by the printer as soon as the printer is available for printing. In another mode, called the "document server" mode, the user sends a document server print job ("print job") to the printer which holds it in memory until a file name and password is entered using the front panel of the printer. This "document server" mode may be useful, for example, when the printer is located far away from the computer. The user, who just sent a print job to the printer, may not want the printer to print until the user arrives at the printer. In the "document server" mode, the user may thus prevent others from reading a confidential document or misplacing the user's printout. In this mode, the user also has the flexibility to check that the printer has enough paper before starting to print a large file, or to load the printer with a special paper, e.g., color paper or transparencies. The "document server" mode is therefore a popular mode of using a printer.

FIG. 2 illustrates a block diagram of a conventional "document server" system. The user computer 20 includes an operating system (OS) 30 which interacts with a printer driver 40 so as to enable a user to send a print job to the printer 10 via a connection L1. The connection L1 can be a cable connected to the printer 10 and to an I/O controller/printer port (not shown) of computer 20. Alternatively, the connection L1 can be a network connecting the printer 10 to a communication controller/network card (not shown) of the computer 20. The printer driver 40 is a software interface permiting interaction betwen a specific printer and a specific operating system. The operating system 30 sends signals in accordance with instructions from the printer driver 40 to a printer port and/or network card (not shown), thus sending signals corresponding to the document or other item to be printed to the printer 10 via the connection L1.

The printer driver 40 can provide, for example, graphical user interfaces 400 and 500, as shown in FIGS. 3 and 4, respectively, which are conventional and well-known to those of ordinary skill in the art. In FIG. 3, the "Set up" graphical user interface 400 permits the user to select a job type or mode, for example by selecting "Document Server" on a "Job Type" drop-down menu 410. The user may also set a variety of printing attributes, such as a print job orientation using an "Orientation" drop-down menu 420, or a paper size using a "Paper Size" drop-down menu 430. The user may then select an "OK" push button 440 and/or an "Apply" push button 460. The "OK" push button 440, "Cancel" push button 450 and "Apply" push button 460 are well known in the art and are default push buttons supplied with a window programming package, such as a window program package sold under the trademark VISUAL BASIC, or other window system.

In FIG. 4, the "Statistics" graphical user interface 500 permits the user to enter a file name in a "File Name" window 510 and a password in a "Password" window 520, the file name and password being associated with the print job sent to the printer 10. A user code can also be entered in a "User Code" window 530 of the graphical user interface 500.

Returning to FIG. 2, the printer 10 includes a printer controller 50, which receives and holds the print job in memory. A front panel 60 permits the user to enter a file name and a password which the printer controller 50 matches with the file name and password entered with the graphical user interface 500. Upon matching, the printer controller 55 instruct the printing mechanism 70 to execute the print job.

Although the "document server" mode is popular, conventional systems capable of implementing the "document server" mode have an important drawback: once a first print job is sent to the printer 10, the user cannot change the printing attributes of the first print job from the user's computer. In conventional systems, the user has to send a second, updated print job and either cancel the first print job using the front panel of the printer or print out the first print job before printing out the second, updated print job. The present inventor has determined that this lack of flexibility in changing printing attributes from the user's computer leads to inefficiencies and loss of time and resources.

SUMMARY OF THE INVENTION

Accordingly, one object of the present invention is to solve the above-noted problems and to increase the flexibility in managing a document server print job.

Another object of the present invention is to provide a method and a system for managing a document server print job which is capable of remotely managing a document server print job from a user computer.

Yet another object of the present invention is to provide a computer program product, which remotely manages a document server print job from a user computer.

Still another object of the present invention is to provide a graphical user interface which may be included with the computer program product.

Another object of the present invention is to provide a method of managing a document server print job using a computer program product which remotely manages a document server print job from a user computer.

To achieve these and other objects, the present invention provides a system that includes a database configured to store print job information; and a remote manager configured to 1) access the print job information from the storage device, 2) provide a first graphical user interface prompting a user to enter identification information, and 3) compare the identification information with information stored in the storage device. The remote manager may be further configured to 4) provide a second graphical user interface displaying at least part of the print job information upon validation of the identification information, and 5) update the storage device with print job information edited with the second graphical user interface. The remote manager resides on a computer along with a printer driver and an operating system. A printer is connected to the computer via a connection which may include a network. The print job information edited with the second graphical user interface is transmitted to the printer, which includes a printer controller configured to store printing information and configured to replace a first set of printing information with a second set of printing information when the second set includes a same identification information as the first set. The printer includes a printing mechanism configured to print according to the print job information edited using the remote manager.

The remote manager is typically a computer program, which receives data output from a database or from a user through the graphical user interfaces, transforms the received data in some desired way, and then outputs the transformed data stream to the printer driver.

The present invention also provides a graphical user interface to assist a user in operating the computer program. In particular, the graphical user interface according to the present invention includes a plurality of pop-up menus having various display controls to control the operation of the computer program.

BRIEF DESCRIPTION OF THE DRAWINGS

FIGS. 9A–B show a flowchart illustrating a method of managing a print job according to the present invention;

FIG. 10 is a flowchart illustrating the method of printing according to the present invention.

DESCRIPTION OF THE PREFERRED EMBODIMENTS

Figure 5:
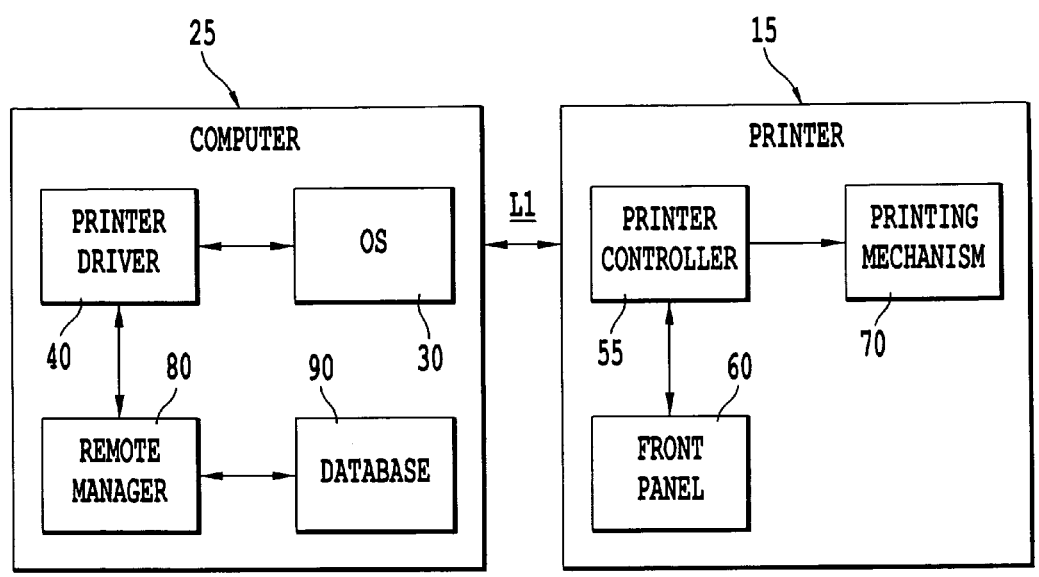
FIG. 5 is a block diagram illustrating a printing system according to the present invention.

Referring now to the drawings, wherein like reference numerals designate identical or corresponding parts throughout the several views, FIG. 5 is a block diagram illustrating a printing system according to the present invention. The system includes at least one computer 25 which may be implemented as a personal computer and is connected to a printer 15 via a connection L1. In one embodiment, the connection L1 is a conventional printer cable, as well-known in the art.

Figure 1:
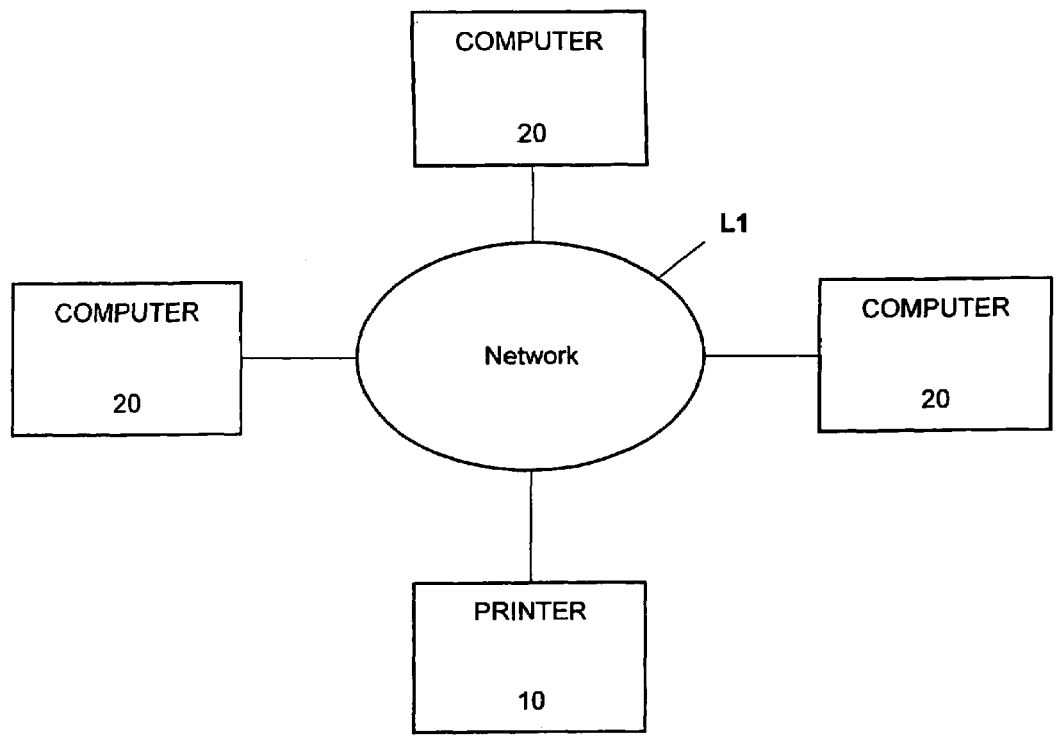
FIG. 1 is a block diagram showing an overall system configuration according to the present invention.
Figure 2:
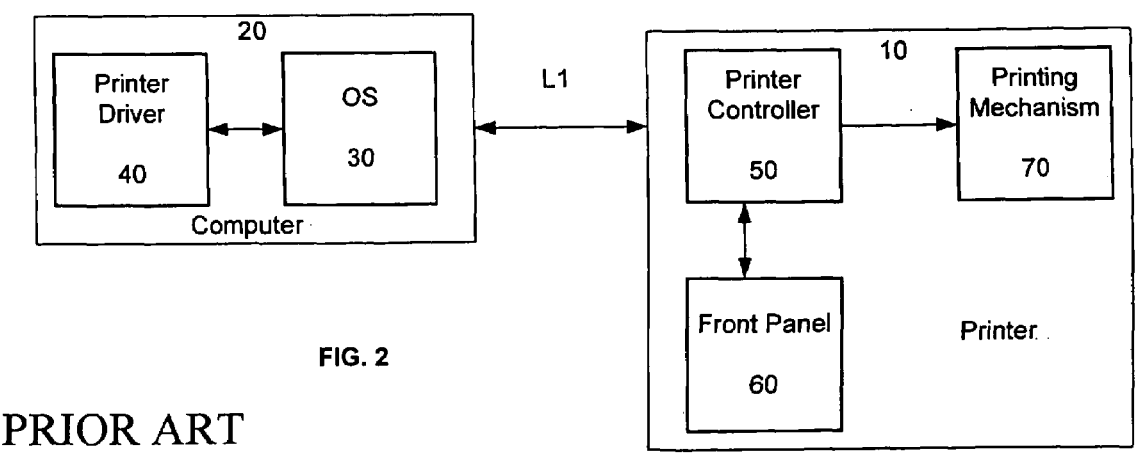
FIG. 2 is a block diagram illustrating a conventional printing system.

In another embodiment, the connection L1 is a network, so that an overall printing system according to the present invention is similar to the system shown in FIG. 1. In this network embodiment, the connection L1 may be a local area network (LAN), a wide area network (WAN), an intranet or extranet, either of which may include at least a portion of a publically accessible network, such as the Internet. Local area networks are well-known in the art and are explained for example in chapter 37 of "How Computers Work", by Ron White, Que Corporation, pps. 340–349, September, 1999, ISBN: 0-7897-2112-0, the entire content of this book being hereby incorporated by reference. Further, the manner of connecting the computer 25 to a network is known and can be accomplished in any desired manner. A virtual private network (VPN) may be used as well for the network L1. Other communications links such as a wireless link including links such as radio frequency and infrared may be used as well.

Returning to FIG. 5, the printer 15 includes a printer controller 55, which controls the print job received from the computer 25. The printer 15 also includes a front panel 60, which allows users to enter a file name and a password, and a printing mechanism 70, which is configured to execute the print job based on the controller 55's instructions. The printing mechanism 70 may include, for example, a laser, color, black/white, dot matrix, impact, ink-jet printing or other desired printing engine. The printer controller 55 may include a conventional memory or hard drive to hold the print job until a user enters the file name and password corresponding to the print job.

The computer 25 includes an operating system 30, for example Windows NT 2000, available from Microsoft, Inc. Other operating systems can be used, for example, Window 98, DOS, Unix, System 8, or Linux. A variety of software applications may be hosted on the operating system 30, for example word processors, spreadsheets, presentation processors, graphic software, accounting software, or any other application that produces documents to be printed. The computer 25 also includes a printer driver 40, which is a software interface permitting interaction between a specific printer and a specific operating system of application program. The operating system 30 sends signals in accordance with instructions from the printer driver 40 to a printer port and/or network card (not shown), thus sending signals corresponding to the document or other item to be printed to the printer 15 via the connection L1.

Advantageously, the computer 25 also includes a print job remote manager 80, which permits a user to interact with the printer driver 40 and the operating system 30 so as to remotely manage the document server print job sent to the printer manager 55. The details of print job remote manager 80 are further described below. The computer 25 also includes a database 90 within a storage device configured to hold file names, passwords, and printing attributes. Any storage device may be used to store the database 90 including, for example, a hard disk drive, a random access memory, a nonvolatile memory, or any other type of memory. When a new file name and password are entered, for example via the graphical user interfaces 400 or 500, the information is sent to the database 90 by the print job remote manager 80. In other words, the print job remote manager 80 is configured to access the database 90. When the printing attributes of a specific print job are changed via the print job remote manager 80, the database 90 is updated to reflect those changes by print job remote manager 80. In one embodiment, if a user enters a file name via the graphical user interface 500, with a password and a first set of printing attributes using graphical user interface 400, the information is stored in the database 90. At a later time, the user may enter, using graphical user interfaces provided by the print job remote manager 80 as discussed below, the same file name with the same password but with a second set of printing attributes using the print job remote manager 80. The print job remote manager 80 updates the database 90 so that the second set of printing attributes overrides the first set.

In one embodiment of the present invention, the printer controller 55 is configured to replace a first set of printing attributes with a second set of printing attributes when the second set is associated with the same identification information, e.g., the same file name and same password, as the first set. Accordingly, a user is able to manage the print jobs already sent to the printer 15 without having to go to the printer 15 and enter instructions on the front panel 60. Using the print job remote manager 80 of the present invention, the user may edit the print job from the user computer 25. The print job remote manager 80 thus increases the flexibility of a document server printing system.

The database 90 is a digital repository that may be implemented, for example, through a commercially available relational database management system (RDBMS) based on the structured query language (SQL) such as ORACLE, SYBASE, INFORMIX, or MICROSOFT ACCESS, through an object-oriented database management system (ODBMS), or through custom database management software. In one embodiment, the database 90 contains all information of interest for printing a print job. For example, the database 90 includes the file names, the passwords, the user codes and the printing attributes for each print job sent to printer 15. The database 90 may reside on a storage device of computer 25, or reside on another device connected to computer 25, for example, by way of a local area network L2 (not shown) or other communications link such as a virtual private network, wireless link, or Internet-enabled link.

Figure 6:
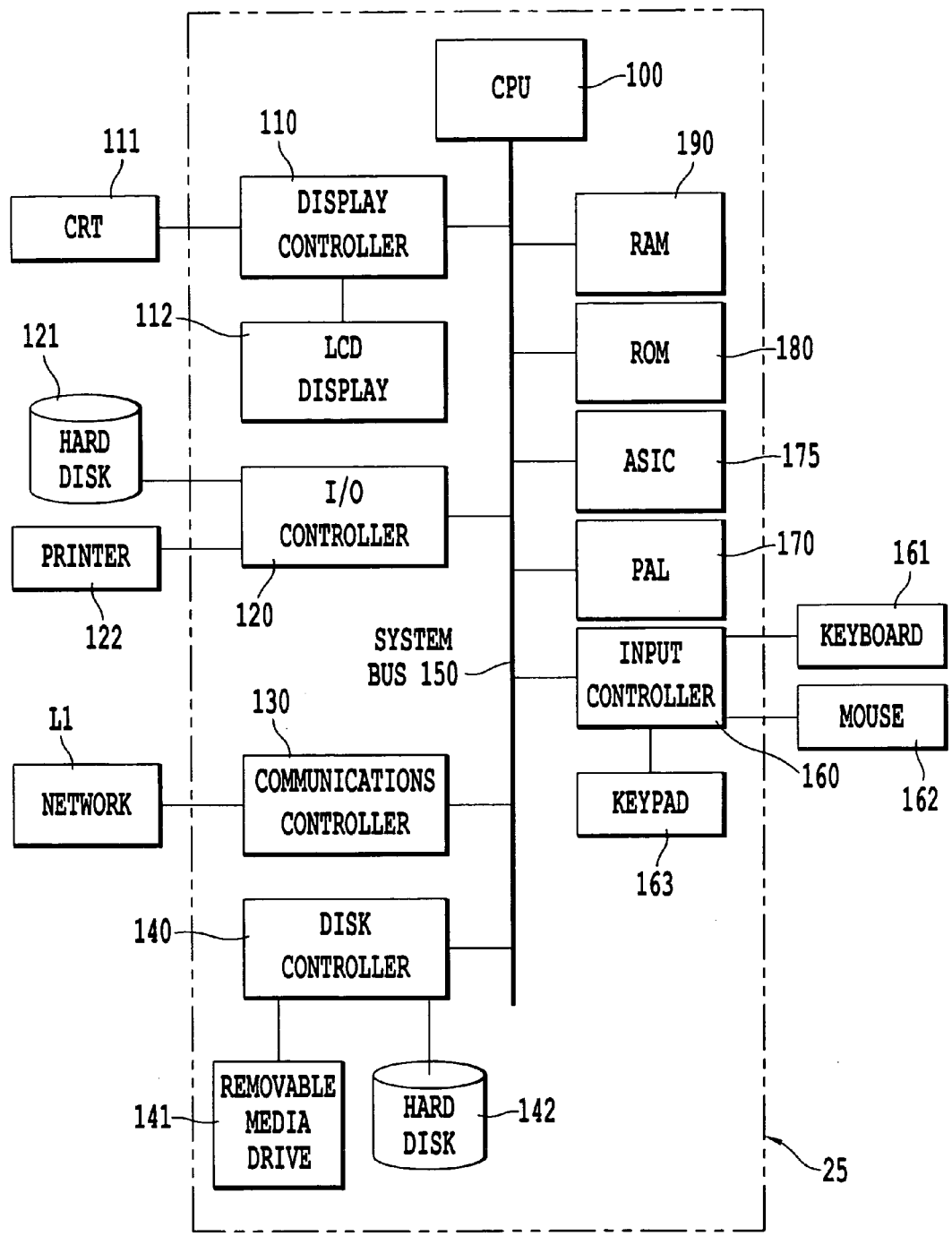
FIG. 6 is a block diagram showing the various components of a computer according to the present invention.

The computer 25 can be a personal computer, a portable computer, a computer workstation with sufficient memory and processing capability, or any device configured to work like a computer. In one embodiment, the computer 25 is a device as diagrammatically shown in FIG. 6. In this embodiment, the computer 25 includes a central processing unit 100 (CPU) that communicates with a number of other devices by way of a system bus 150. The computer 25 includes a random access memory (RAM) 190 that stores temporary values used in implementing the print job remote manager 80's managing of printing information and the database 90's storing of printing information.

The central processing unit 100 is configured for high volume data transmission and performing a significant number of mathematical calculations in processing communications and database searches. A Pentium III microprocessor such as the 1 GHz Pentium III manufactured by Intel Inc. may be used for CPU 100. This processor employs a 32 bit architecture. Other suitable processors include the Motorola 500 MHZ PowerPC G4 processor and the Advanced Micro Devices 1 GHz AMD Athlon processor. Multiple processors or workstations may be used as well.

The ROM 180 is preferably included in a semiconductor form although other read-only memory forms including optical media may be used to host application software and temporary results. The ROM 180 connects to the system bus 150 for use by the CPU 100. The ROM 180 includes computer readable instructions that, when executed by the CPU 100, perform different functions associated with printing and remotely managing print jobs. An input controller 160 connects to the system bus 150 and provides an interface with various peripheral equipment including a keyboard 161 and a pointing device such as a mouse 162, so as to permit user interaction with graphical user interfaces 400, 500, 600 and 700. The input controller 160 may include different ports such as a mouse port in the form of a PS2 port or, for example, a universal serial bus (USB) port. The keyboard port for the input controller 160 is in the form of a mini-DIN port although other connectors may be used as well. The input controller 160 provides sound card connections so that external jacks on the sound card allow users to attach microphone speakers or an external sound source. The input controller 160 also may include serial ports or parallel ports as well.

A disk controller 140 is in the form of an IDE controller and connects via ribbon cables to a removable media drive 141 which may be implemented as a floppy disk drive, as well as a hard disk drive 142 and a CD-ROM drive (not shown). In addition, a PCI expansion slot is provided on the disk controller 140 or mother board that hosts the CPU 100. An enhanced graphic port expansion slot is provided and provides 3-D graphics with fast access to the main memory. The hard disk 142 may also include a CD drive that may be readable as well as writeable. A communication controller 130 provides a connection to a network L1. The network L1 may be a connection to the public switch telephone network (PSTN) for providing Internet access, or to a local area network, wide area networks, a virtual private network (VPN), or an extranet. In one embodiment, the network L1 and the connection to the communication controller 130 are made by way of a plurality of connections including a cable-modem connection, DSL connection, fiber optic connection, dial-up modem connection, and the like that connect to the communication controller 130.

An input/output controller 120 also provides connections to external components such as an external hard disk 121, a printer 122, for example, by way of an RS 232 port and a SCSI bus. As noted above, the present invention is not limited to network connections, but can be implemented with a simple printer cable connection between a printer 15 (shown as printer 122 in FIG. 6) and computer 25.

A display controller 110 interconnects the system bus 150 to a display device, such as a cathode ray tube (CRT) 111. While a CRT is shown, a variety of other display devices may be used such as an LCD (liquid crystal display), or plasma display device. The display device permits displaying of graphical user interfaces 400, 500, 600 and 700.

Print job remote manager 80 is now described in more detail in connection with FIGS. 7–9A–B.

Figure 7:
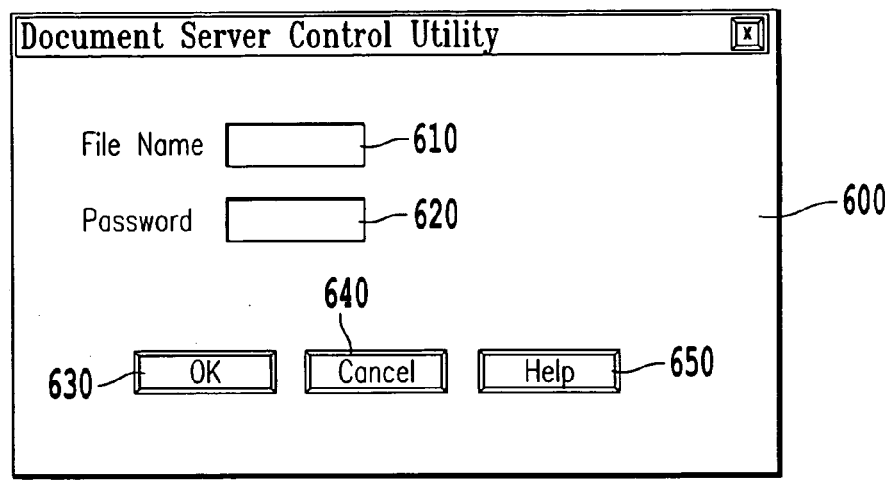
FIG. 7 is an example of a graphical user interface that can be implemented in the present invention.

FIG. 7 shows a graphical user interface 600 provided by the print job remote manager 80 and displayed by the computer 25. The graphical user interface 600 includes a "File Name" window 610, in which a user enters a file name, and a "Password" window 620, in which a user enters a password. The entered file name is the identification information that identifies the user's print job. The password is included for security and allows a user to keep others from editing or printing the user's print job. The user may then select an "OK" push button 630 and/or an "Apply" push button 650. The "OK" push button 630, "Cancel" push button 640 and "Apply" push button 650 are well known in the art and are default push buttons supplied with a window programming package, such as window program package sold under the trademark VISUAL BASIC, or other window system.

Figure 8:
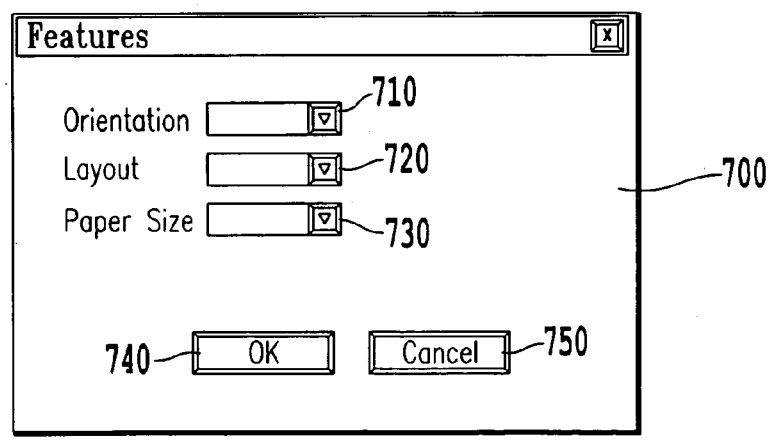
FIG. 8 is an example of a graphical user interface that can be implemented in the present invention.

As shown in FIG. 8, the print job remote manager 80 provides another graphical user interface 700 displaying at least part of the print job information at the computer 25. For example, the graphical user interface 700 displays the orientation of the paper in an "Orientation" window 710; the layout of the print job in a "Layout" window 720; and a paper size in a "Paper Size" window 730. Using the graphical user interface 700, the user may change any of these printing attributes by entering the new attribute in the appropriate window. The new attribute may be typed in the appropriate window, or may be selected by highlighting a selection of a drop-down menu. The user may then enter the changes by selecting an "OK" push button 740, which is similar to the push button 630. The user may also keep the original settings, i.e., chose not to edit the printing attributes, by selecting a "Cancel" push button 750, which is similar to the "Cancel" push button 640.

FIGS. 9A–B illustrate a flowchart of the various functions performed by the print job remote manager 80. First, the print job remote manager 80 places print job information in the database 90 (step 800). This information may have been entered at the computer 25 using the graphical user interfaces 400 (FIG. 3), 500 (FIG. 3), 600 (FIG. 7) or 700 (FIG. 8). At step 810, the print job remote manager 80 provides the graphical user interface 600 (FIG. 7). At step 820, the print job remote manager 80 compares the identification information entered using the graphical user interface 600, for example the file name and password, with the information already entered in the database 90 (step 820). If the information does not match at step 825, the print job remote manager 80 may either end or request the user to reenter a file name and password (step 830). If the information matches at step 825, i.e. the print job remote manager 80 validates the identification information, the print job remote manager 80 provides at step 840 the graphical user interface 700 (FIG. 8) at the computer 25. The graphical user interface 700 displays at least part of the print job information corresponding to the identification information, for example, the orientation of the paper, the layout of the print job, and the paper size. The user may change any of these printing attributes by entering the new attribute in the appropriate window from the computer 25.

Selecting the "Cancel" push button 750 of the graphical user interface 700 (FIG. 8) causes the print job remote manager to end at step 850.

Selecting the "OK" push button 740 of the graphical user interface 700 (FIG. 8) causes the print job remote manager 80, printer driver 40 and operating system 30 to transmit the updated set of printing attributes to printer controller 55 at step 860. In one embodiment, upon receiving a second set of printing attributes associated with a same identification information, e.g., same file name and password, the printer controller 55 is configured to cancel the first print job and to keep the second print job pending.

Selecting "OK" push button 740 of the graphical user interface 700 (FIG. 8) also causes the print job remote manager 80 to update the database 90 with the new set of printing attributes at step 870.

Figure 3:
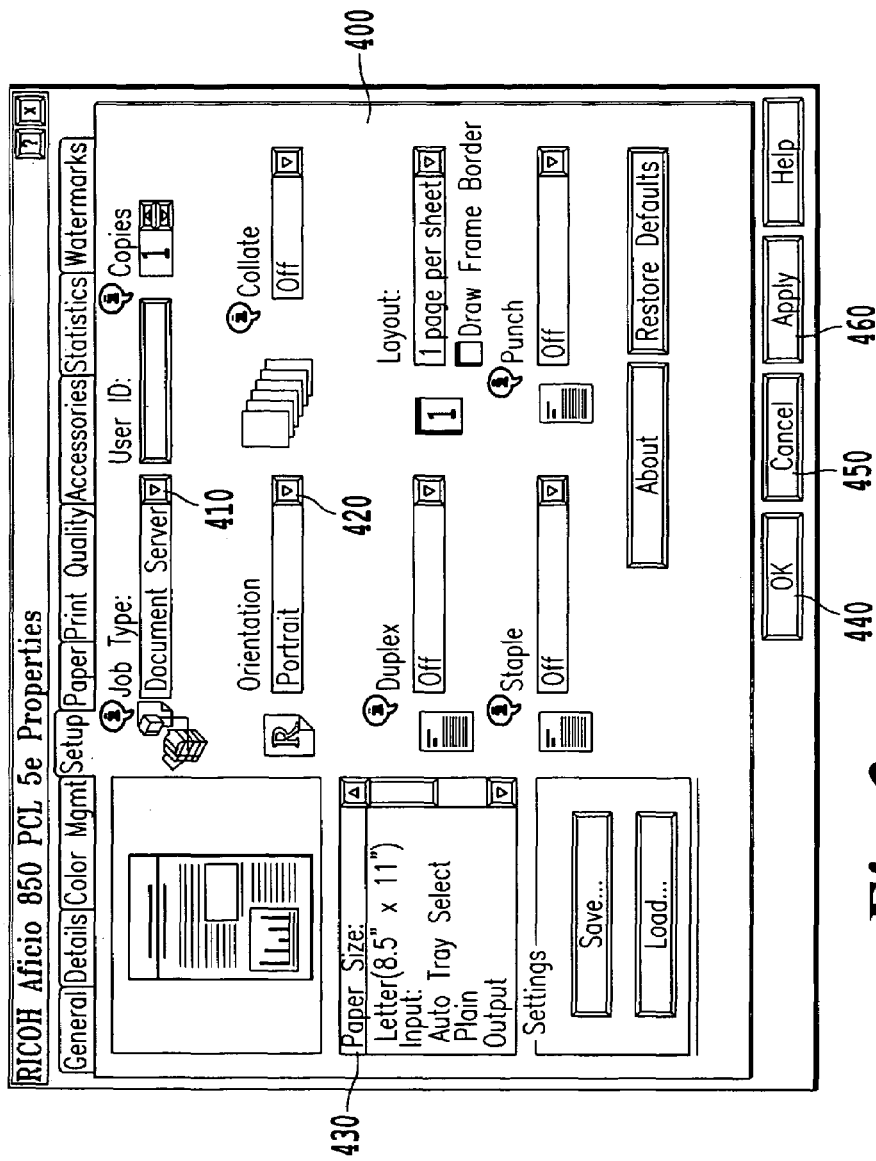
FIG. 3 is an example of a graphical user interface that can be implemented in the present invention.
Figure 4:
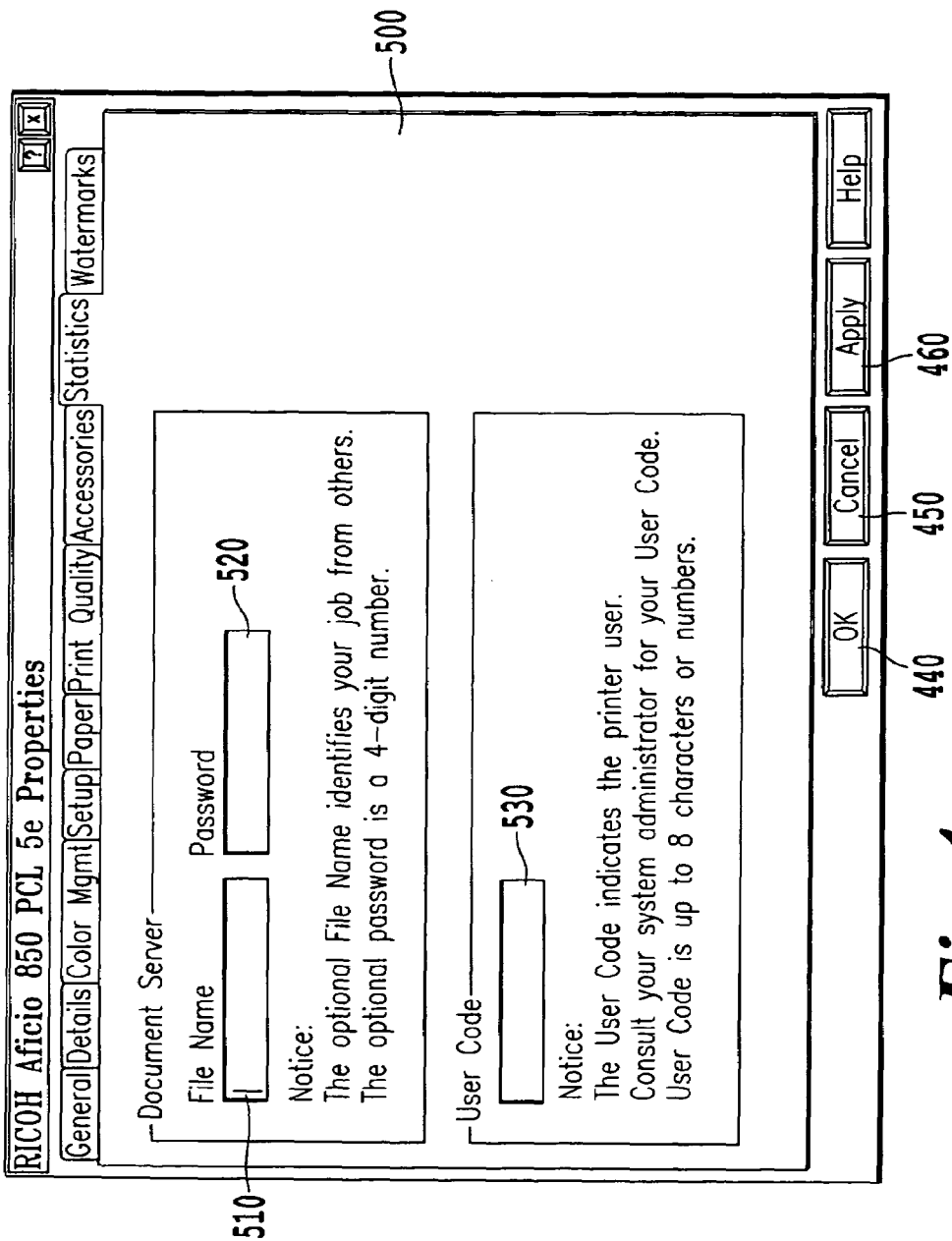
FIG. 4 is an example of a graphical user interface that can be implemented in the present invention.

FIG. 10 illustrates an overall method of printing using the print job remote manager 80. At step 900, a user selects the "document server" mode for the printer, using for example the graphical user interface 400 (FIG. 3). At step 910 the user enters printing attributes, a file name and a password, using for example the graphical user interfaces 400 and 500 (FIGS. 3 and 4). At step 920, the print job remote manager 80 sends the printing attributes, file name and password to the database 90 (see also step 800 of FIG. 9). The printing attributes, file name and password are also sent to printer controller 55.

If the user desires to print a document using the printing attributes at step 930, the user enters identification information, such as the file name and password, on the front panel 60 of the printer 15 at step 940. The document is then printed by the printing mechanism 70. If the user does not want to print the document at step 930, the user has the option to review the printing attributes of the print job at step 950. If the user does not wish to review the printing attributes, the printing sequence ends at step 960. If the user chooses to review the printing attributes, either after printing at step 940 or instead of printing, the print job remote manager 80 is run at step 970. The print job remote manager 80 then provides graphical user interfaces at computer 25, such as the graphical user interfaces 600 and 700 shown in FIGS. 7 and 8, respectively (see also step 810 of FIG. 9). If the user edits the printing attributes at step 980, the edited printing attributes are sent to the database 90 and to the printer controller 55 at step 990 (see also steps 860 and 870 of FIG. 9). If the user wants to print the document using the edited printing attributes, the user enters identification information, such as the file name and password, on the front panel 60 of the printer 15 at step 940. If the user does not edit the printing attributes at step 980, the user can either print by going back to step 940, re-run print job remote manager 80 by going back to step 970, or end the printing sequence at step 960.

The above steps performed by the print job remote manager 80 according to the present invention may be implemented by a computer program product that may be hosted on a storage medium and include instructions that can be used to program a computer to perform a process in accordance with the present invention. This storage medium can include, but is not limited to, any type of disk including floppy disks, optical disks, CD-ROM, magneto-optical disks, ROMs, RAMs, EPROMs, EEPROMs, Flash Memory, Magnetic or Optical Cards, or any type of media suitable for storing electronic instructions.

This invention may also be conveniently implemented using a conventional general purpose digital computer programmed according to the teachings of the present specification, as will be apparent to those skilled in the computer art. Appropriate software coding can readily be prepared by skilled programmers based on the teachings of the present disclosure as will be apparent to those skilled in the software art. In particular, the computer program product for remote managing print jobs according to the present invention can be written in a number of computer languages including but not limited to C, C++, Fortran, and Basic, as would be recognized by those of ordinary skill in the art. The invention may also be implemented by the preparation of applications specific integrated circuits or by interconnecting an appropriate network of conventional component circuits, as will be readily apparent to those skilled in the art.

Obviously, numerous additional modifications and variations of the present invention are possible in light of the above teachings. It is therefore to be understood that within the scope of the appended claims the present invention may be practiced otherwise than as specifically described herein.

What is claimed is:

1. A method of managing a print job, comprising the steps of:

transmitting print job information to a printer;

storing said print job information in a storage device separate from said printer;

prompting a user to enter identification information at a computer separate from said printer;

comparing said identification information with information stored in said storage device; and editing said print job information at said printer using said computer, wherein said editing of said print job information is performed while said print job information is at said printer.

2. The method of claim 1, wherein transmitting said print job information to said printer comprises sending said print job information from said computer.

3. The method of claim 1, further comprising the steps of:
validating said identification information; and
displaying at least part of said print job information at said computer.

4. The method of claim 3, wherein the editing step comprises editing said at least part of said print job information at said computer, and said method further comprising the step of updating said storage device with print job information edited in said editing step.

5. The method of claim 3, wherein the editing step comprises editing said at least part of said print job information at said computer, and said method further comprising the step of transmitting to said printer print job information edited in said editing step.

6. The method of claim 4, further comprising the step of transmitting to said printer said print job information edited in said editing step.

7. The method of claim 5, further comprising the step of replacing a first set of printing information with a second set of printing information when said second set includes a same identification information as said first set.

8. The method of claim 7, further comprising the step of printing a document according to said second set of printing information.

9. The method of claim 1, wherein said storage device is provided in said computer.

10. The method of claim 1, wherein said step of editing comprises replacing print attributes of said print job information at said printer using said computer.

11. A system for managing a print job, comprising:
means for transmitting print job information to a printer;
means for storing said print job information in a storage device separate from said printer;
means for prompting a user to enter identification information at a computer separate from said printer;
means for comparing said identification information with information stored in said means for storing; and
means for editing said print job information at said printer using said computer, wherein said means for editing is configured to perform said editing of said print job information while said print job information is at said printer.

12. The system of claim 11, wherein said means for transmitting said print job information to said printer comprises means for sending said print job information from said computer.

13. The system of claim 11, further comprising:
means for validating said identification information; and
means for displaying at least part of said print job information at said computer.

14. The system of claim 13, wherein said means for editing is configured to edit said at least part of said print job information at said computer, and said system further comprising means for updating said means for storing with print job information edited with said means for editing.

15. The system of claim 14, further comprising:
means for transmitting to said printer said print job information edited with said means for editing.

16. The system of claim 13, wherein said means for editing is configured to edit said at least part of said print job information at said computer, and said system further comprising means for transmitting to said printer said print job information edited with said means for editing.

17. The method of claim 16, further comprising:
means for replacing a first set of printing information with a second set of printing information when said second set includes a same identification information as said first set.

18. The method of claim 17, further comprising:
means for printing a document according to said second set of printing information.

19. The system of claim 11, wherein said storage device is provided in said computer.

20. The system of claim 11, wherein said means for editing comprises means for replacing print attributes of said print job information at said printer using said computer.

21. A computer program product, comprising:
a computer storage medium and a computer program code mechanism embedded in the computer storage medium for causing a computer to manage a print job, the computer program code mechanism comprising:
a first computer code device configured to transmit print job information from said computer to a printer separate from said computer;
a second computer code device configured to store said print job information in a storage device separate from said printer;
a third computer code device configured to prompt a user to enter identification information at said computer;
a fourth computer code device configured to compare said identification information with information stored in said storage device; and
a fifth computer code device configured to edit said print job information at said printer using said computer, wherein said editing of said print job information occurs while said print job information is at said printer.

22. The computer program product of claim 21, further comprising:
a sixth computer code device configured to validate said identification information; and
a seventh computer code device configured to display at least part of said print job information at said computer.

23. The computer program product of claim 22, wherein said fifth computer code device is configured to edit said at least part of said print job information at said computer, and said computer program product further comprising an eighth computer code device configured to update said storage device with print job information edited with said seventh computer code device.

24. The computer program product of claim 23, further comprising:
a ninth computer code device configured to transmit to said printer said print job information edited with said seventh computer code device.

25. The computer program product of claim 22, wherein said fifth computer code device is configured to edit said at least part of said print job information at said computer, and said computer program product further comprising an eighth computer code device configured to transmit to said printer said print job information edited with said seventh computer code device.

26. The computer program product of claim 25, further comprising:
a ninth computer code device configured to replace a first set of printing information with a second set of printing information when said second set includes a same identification information as said first set.

27. The computer program product of claim 26, further comprising:

a tenth computer code device configured to instruct said printer to print a document according to said second set of printing information.

28. The computer program product of claim 21, wherein said storage device is provided in said computer.

29. The computer program product of claim 21, wherein said fifth computer code device is configured to replace print attributes of said print job information at said printer using said computer.

30. A graphical user interface for managing a print job originated from a computer, comprising:

a display of printing attributes transmitted to a printer separate from said computer;

an input to perform editing of said printing attributes using said computer while said printing attributes are at said printer; and a first push button configured to be selected so as to transmit edits to said printing attributes edited with said input to said printer and to a storage device separate from said printer, wherein said graphical user interface is said computer.

31. The graphical user interface of claim 30, wherein said window further comprises:

a first sub-window configured to display and receive printing orientation information;

a second sub-window configured to display and receive printing layout information; and a third sub-window configured to display and receive printing paper size information.

32. The graphical user interface of claim 30, further comprising a second push button configured to be selected so as to end a print job managing sequence.

33. The graphical user interface of claim 30, wherein said storage device is provided in said computer.

* * * * *